/ Patented Nov. 28, 1950

2,532,018

UNITED STATES PATENT OFFICE 2,532,018

PLASTICIZED RESIN COMPOSITIONS

Don E. Floyd, Robbinsdale, Minn., assignor to General Mills, Inc., a corporation of Delaware No Drawing. Application November 19, 1949,
Serial No. 128,499

7 Claims. (Cl. 260—31.8)

The present invention relates to plasticized polyvinyl resin compositions. Polyvinyl resins are generally too hard and rigid to be used for many purposes without a plasticizer. It is usually necessary to add a plasticizer to make the resins soft, pliable, and capable of being milled into strong pliable sheets or films. It is also necessary that the plasticized resin composition have excellent heat stability, suppleness, and elasticity. In order for material to act as a plasticizer, it is necessary that it be compatible with the resin and not exude or sweat out leaving the resin unplasticized.

There have been found very few plasticizers which are really satisfactory for this purpose. The esters of dibasic acids such as phthalic and sebacic acids, and particularly esters such as the di-2-ethylhexyl esters, commonly known as dioctyl phthalate and dioctyl sebacate, have been used most widely for plasticizing of these resins. Unless an ester of such a high molecular weight is employed, the plasticizers are of too low a molecular weight and are, therefore, too volatile for many uses. The plasticizers which possess the requisite properties of being non-volatile and of having the ability of give flexibility at low temperature, and some measure of stability against heat discoloration are quite limited in number.

It has now been found that compounds having the following formula are excellent plasticizers for polyvinyl resins:

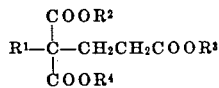

in which $R^1$ is an aliphatic hydrocarbon substituent containing from 10 to 16 carbon atoms, and may be saturated or unsaturated, $R^2$, $R^3$ and $R^4$ are aliphatic or cycloaliphatic hydrocarbon groups containing from 1 to 8 carbon atoms, such as methyl, ethyl, butyl, octyl, and cyclohexyl. They may be alike or different.

The invention is applicable to polyvinyl resins in general, and particularly to the polyvinyl esters such as polyvinyl chloride, polyvinyl acetate, vinyl chloride-vinyl acetate copolymers, and vinyl chloride-vinylidene chloride copolymers.

It is therefore an object of the present invention to provide plasticized polyvinyl resin compositions containing compounds having the above formula.

The polybasic acid esters used in the present invention may be prepared by the addition reaction of aliphatic substituted malonic esters with acrylic esters as indicated in the following equation.

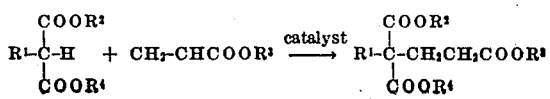

The catalyst used in the reaction is a strong base such as alkali metal, a metal hydride, a metal alkoxide or other strongly basic substance. The substituted malonic esters employed in the reaction may be prepared according to methods available in the literature, but preferably are prepared according to the process described in my copending application, Serial No. 596,811, filed May 30, 1945, entitled Ester Condensation, now Patent Number 2,523,692.

Usually it is desirable to carry out the acrylate ester addition reaction in the presence of a solvent. A wide variety of solvents are useful, particularly the aliphatic alcohols and aromatic hydrocarbons. It is important that the reagents and catalyst be soluble in the solvent used; otherwise the addition will take place slowly, if at all. The alkali metal derivatives of these substituted malonic esters can be prepared by adding the metal to a solution of the malonate in an inert solvent. These metal derivatives are sufficiently soluble in hydrocarbon solvents to be suitable catalysts. It is possible to eliminate the solvent if the catalyst is soluble directly in the substituted malonate.

Considerable heat is evolved during the addition reaction and the temperature may be controlled by the use of cooling baths or by the gradual addition of the reactants.

The products of the addition reaction are in general colorless, slightly viscous liquids, and have faint, pleasant odors. They are high boiling and have sufficiently low volatility at ordinary temperatures to render them useful as plasticizers. All of the products of the present invention possess three carboxylic ester groups and a long chain aliphatic hydrocarbon substituent. The physical properties and chemical structures make these new compounds valuable as plasticizers.

Example 1

34 g. (0.5 mole) of sodium ethylate was dissolved in 146 g. (1.0 mole) of ethyl oxalate in a flask protected from moisture of the air by a calcium chloride tube, and to this solution was added 114 g. (0.5 mole) of ethyl laurate. The flask was attached to a still-head and condenser connected to a cooled receiver. A vacuum of about 100 mm. was maintained while the reaction mixture was heated gently in such a manner that alcohol was slowly distilled over into the receiving vessel. When no more alcohol was produced (1 to 2 hours depending on the rate of heating) the excess ethyl oxalate was distilled from the reaction mixture at a pressure of about 15 mm. Recovery of this excess was nearly quantitative. The residue in the flask consisted of the sodio derivative of the ethyl alpha-ethoxalyl laurate which compound was present in nearly quantitative yield. This sodio derivative was converted to the free ester by treatment with a slight excess of dilute acetic acid and the free ester was extracted with ether. This extract was washed free from acid and salts and then dried. Elimination of the ether by distillation produced ethyl alpha-ethoxalyl laurate.

This compound was heated to 160–165° C. whereupon it decomposed to give diethyl n-decylmalonate with the evolution of carbon monoxide. The diethyl n-decylmalonate was then distilled in vacuum and was found to boil at 145–149° C./2 mm. The yield amounted to 127.3 g. or about 85%.

A solution of 0.05 g. of metallic sodium in 10 ml. of absolute ethanol was prepared and to it was added 30 g. (0.1 mole) of ethyl n-decylmalonate. The usual precautions against atmospheric moisture and carbon dioxide were taken. The reaction mixture was stirred mechanically and then 9.5 g. (0.1 mole+10% excess) of methyl acrylate was added gradually. Heat was evolved and the reaction temperature was maintained at 50–55° C. by the very gradual addition of the acrylate ester. The mixture was allowed to stand for about two hours after which the catalyst was neutralized with a few drops of acetic acid. The product was isolated by ether extraction, washed and dried over anhydrous sodium sulfate. After removal of the ether the remaining liquid was subjected to fractional distillation under reduced pressure, using an 8-inch, indented column and a total-condensation, variable take-off stillhead. There was obtained a forerun weighing 1.2 g. which was discarded and then 30.6 g. of the ethyl n-decylmalonate addition product of methyl acrylate (B. P. 128–132° C./0.08 mm.). The product was probably a mixture of compounds due to the possible exchange of ester groups $R^2$, $R^3$ and $R^4$ during the reaction. The residue remaining in the distilling flask weighed 0.8 g. The $n_D^{25}$ of the addition product was 1.4450. The yield was 79%.

The n-decylmalonate addition product of methyl acrylate prepared as above was tested as a plasticizer for a copolymer of vinyl chloride and vinyl acetate (VYNW resin made by Carbide and Carbon Chemicals Corporation). A blend of the following ingredients was prepared:

| | G. |
|---|---|
| VYNW resin | 63.5 |
| Basic lead carbonate | 1.0 |
| Stearic acid | 0.5 |
| Plasticizer | 35.0 |

The mixture was milled at 50 lbs. steam pressure on a rubber mill. A tough, pliable, glossy sheet was obtained. The sheet had an excellent appearance. The compatibility of the plasticizer with the resin was excellent and there was no "sweat out" or exudation of plasticizer on standing. The elongation at 25° C. of a strip of plasticized resin (2 in. x 0.1 in. x 0.02 in.) with a pull of 1000 lbs./sq. in. cross-section, determined on a Scott tester, was 99% as compared with 88% for dioctyl phthalate plasticizer under similar conditions.

*Example 2*

To 30 ml. of dry benzene was added 30 g. (0.1 mole) of ethyl n-decylmalonate. Then 0.05 g. of metallic sodium was added to the solution. The sodium dissolved rapidly with evolution of hydrogen and appearance of a pale yellow coloration. Then 9.5 g. (0.1 mole+10% excess) of methyl acrylate was added slowly and with stirring at such a rate that the heat of reaction maintained the temperature at 65–70° C. After about two hours' standing the catalyst was neutralized with a few drops of acetic acid and the mixture was washed and dried. After removal of the benzene by distillation the product was fractionated as in Example 1. There was obtained 4.0 g. of a low boiling fraction and 30.1 g. of the desired addition product which amounts to a yield of about 78%.

*Example 3*

The procedure described in Example 1 was followed using 32.8 g. (0.1 mole) of ethyl n-dodecylmalonate in place of ethyl n-decylmalonate. The amounts of all other reagents were the same as in Example 1. After processing the reaction product as before and after fractionation there was obtained 33.3 g. of the ethyl n-dodecylmalonate addition product of methyl acrylate. This amounts to a yield of 80%. A forerun weighing 1.2 g. and a residue weighing 1.2 g. were also obtained from the fractional distillation. The addition product boiled at 151–4° C./0.1 mm. and had $n_D^{25}$ of 1.4468.

*Example 4*

The procedure described in Example 1 was applied to 35.6 g. (0.1 mole) of ethyl n-tetradecylmalonate using the same amounts of all other reagents as those set forth in that example. The reaction product was processed and fractionated as before. There was obtained 35.4 g. of the ethyl n-tetradecylmalonate addition product of methyl acrylate. This amounts to a yield of slightly more than 79%. There was also obtained a forerun of 1.1 g. and a residue of 1.2 g. from the distillation. The addition product boiled at 165–170° C./0.06 mm. and had $n_D^{25}$ of 1.4485.

*Example 5*

The procedure described in Example 1 was applied to 38.4 g. (0.1 mole) of ethyl cetylmalonate using the same amounts of all other reagents as those set forth in Example 1. The reaction product was processed and fractionated as before. There was obtained 39.0 g. of the ethyl cetylmalonate addition product of methyl acrylate. This amounts to a yield of about 82.5%. There was also obtained a forerun weighing 0.8 g. and a residue weighing 1.2 g. from the distillation. The addition product had a boiling range of 174–8° C./0.06 mm. and $n_D^{25}$ of 1.4501.

*Example 6*

The addition product obtained in Example 5 was alcoholized with ethanol to replace the methyl ester group by an ethyl ester group. A solution of 0.02 g. of sodium metal in 10 ml. of absolute ethanol was prepared and to it was aded 10 g. of the addition product from Example 5. Then 1 g. of ethyl acrylate was also added to inhibit possible reversal of the addition reaction previously carried out. The reaction mixture was heated under reflux for a total of two hours. It was cooled, the catalyst neutralized with a few drops of acetic acid and most of the ethanol evaporated off under reduced pressure. The residual liquid was dissolved in ether, the solution washed and then dried over anhydrous sodium sulfate. After the ether had been removed, the product rapidly solidified. It weighed 9.4 g. Recrystallization from 80% ethanol gave the ethyl 2-cetyl-2-carbethoxyglutarate as colorless needles which melted at 38–9° C.

Example 7

The addition product obtained in Example 1 was alcoholized with cyclohexanol. The reactants consisted of 76 g. of the addition product obtained in Example 1, 100 g. of cyclohexanol and 0.5 g. of metallic sodium. The reaction mixture was heated under gentle reflux and the by-product alcohol (24.1 g.) was gradually distilled off through a 6-inch indented column and collected during a period of 6 hours. The alkali was neutralized with acetic acid and the excess cyclohexanol was distilled off under reduced pressure. The residual liquid was dissolved in ether and the solution washed and dried over sodium sulfate. After removal of the ether the alcoholysis product was distilled under reduced pressure.

Cyclohexyl ester of 4,4-dicarboxytetradecanoic acid was obtained as a fraction weighing 57.9 g. and boiling in the range of 205–217° C./0.1 mm.

The products of Examples 2 to 7 may be used as plasticizers in the manner and with the same general results as those indicated in Example 1.

It has been found that the addition products having substituents $R^1$ which are aliphatic hydrocarbon groups containing less than 10 carbon atoms are not as suitable for the purposes envisioned for the present invention. The preferred substituents $R^1$ are those derived from fatty acids or mixtures of fatty acids such as the mixture of fatty acids obtained by the hydrolysis of a natural fat or oil. There may also be used selected fractions, either saturated or unsaturated but preferably saturated, of the mixed fatty acids of a fat or oil as well as commercially isolated individual fatty acids. When the aliphatic substituted malonates are prepared according to my above identified application, it will be apparent that the aliphatic substituent is two carbon atoms shorter than the carbon chain of the fatty acid from which it is derived. Accordingly it is preferred to use aliphatic substituted malonate esters in which the $R^1$ substituent does not contain in excess of 16 carbon atoms inasmuch as the fatty acids necessary for the production of alkyl malonates having longer substituents are not commonly available. If desired, however, it is possible to produce alkyl substituted malonates having longer aliphatic substituents by the use of less common fatty acids having carbon chains of 20, 22, or more carbon atoms.

It is likewise preferred to employ ethyl groups in the position $R^2$ and $R^4$ and a methyl group in the $R^3$ position inasmuch as malonic esters are commonly available in the form of the ethyl ester and the acrylate esters are commonly available in the form of the methyl or ethyl ester. Where desired, however, it is possible to specially prepare the malonic ester or the acrylate ester with any desired aliphatic or cycloaliphatic hydrocarbon alcohol substituent containing from 1 to 8 carbon atoms. It is also possible to introduce these other ester substituents into the addition product after it is formed as is shown in some of the examples.

In the addition reaction the ratio of reactants is subject to considerable variation. Either reactant may be used in excess. However, it is preferred to use a slight excess of the acrylate ester over the amount necessary to react with the substituted malonate inasmuch as it is more readily removed by distillation than would be an excess of the malonate ester. The preferred reaction temperature is between room temperature and the boiling point of the acrylate ester used. The rate of reaction below room temperature is relatively slow, while the violence of the reaction at higher temperatures would present difficulties. Any inert solvent is suitable for the reaction, although aliphatic alcohol and aromatic hydrocarbon solvents are preferred. Under some circumstances which have previously been described, the use of a solvent is not necessary. As catalyst the strong bases such as alkali metals, their alkoxides, amides, and hydrides are preferred.

While various modifications of the invention have been described, it is to be understood that other variations are possible without departing from the spirit thereof.

I claim as my invention:

1. A polyvinyl resin composition plasticized with a compound having the following formula:

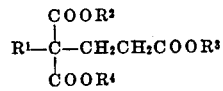

in which $R^1$ is an aliphatic hydrocarbon substituent containing from 10 to 16 carbon atoms, and $R^2$, $R^3$ and $R^4$ are selected from the group consisting of aliphatic and cycloaliphatic hydrocarbon groups containing from 1 to 8 carbon atoms.

2. A polyvinyl resin composition plasticized with a compound having the following formula:

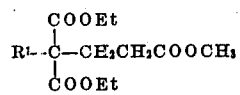

in which $R^1$ is an aliphatic hydrocarbon substituent containing from 10 to 16 carbon atoms.

3. A polyvinyl resin composition plasticized with a compound having the following formula:

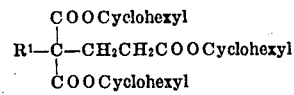

in which $R^1$ is an aliphatic hydrocarbon substituent containing from 10 to 16 carbon atoms.

4. A polyvinyl resin composition plasticized with a compound having the following formula:

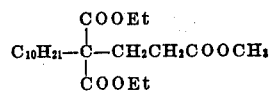

5. A polyvinyl resin composition plasticized with a compound having the following formula:

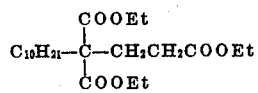

6. A polyvinyl resin composition plasticized with a compound having the following formula:

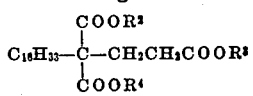

in which $R^2$, $R^3$ and $R^4$ are selected from the group consisting of aliphatic and cycloaliphatic hydrocarbon groups containing from 1 to 8 carbon atoms.

7. A polyvinyl resin composition plasticized with a compound having the following formula:

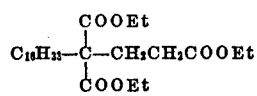

DON E. FLOYD.

No references cited.